United States Patent [19]
Hehl

[11] 3,744,949
[45] July 10, 1973

[54] LOCKING UNIT FOR THE CASING MOLD OF AN INJECTION MOLDING

[76] Inventor: Karl Hehl, Siedlung 183, Lossburg, Germany

[22] Filed: Apr. 6, 1971

[21] Appl. No.: 131,665

[30] Foreign Application Priority Data
Apr. 24, 1970   Germany................... P 20 20 061.7

[52] U.S. Cl............................ 425/153, 425/DIG. 45
[51] Int. Cl............................................. B28b 17/00
[58] Field of Search..................... 425/107, 151, 153, 425/188, 192, DIG. 45

[56] References Cited
UNITED STATES PATENTS
2,415,462   2/1947   Cherry et al................. 425/DIG. 45

FOREIGN PATENTS OR APPLICATIONS
88,022   5/1958   Netherlands................. 425/DIG. 45

Primary Examiner—H. A. Kilby, Jr.
Attorney—Spencer & Kaye

[57] ABSTRACT

A clamping unit for clamping the mold of an injection molding machine has at least one removable protective cover for covering the clamping unit in the area of the mold. The cover has at least three protective cover plates arranged to be moved independently of one another in the opening direction of the clamping unit between an open position and a protective position. Switches and a safety valve are associated with the cover for interrupting the main current and fluid flows of the injection molding machine when all of the cover plates are in their open position.

15 Claims, 6 Drawing Figures

Patented July 10, 1973
3,744,949
2 Sheets-Sheet 1
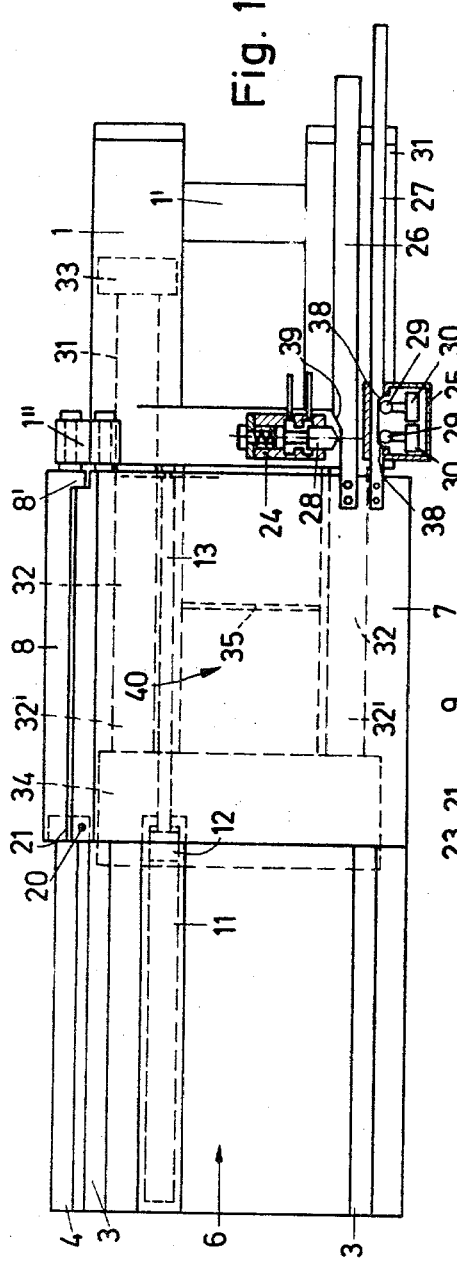
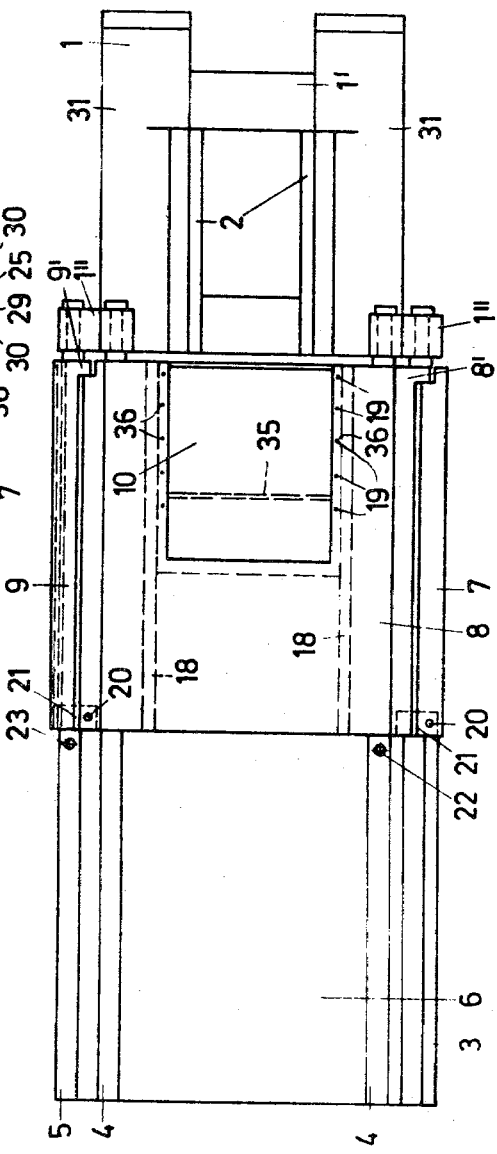
INVENTOR.
Karl Hehl
BY Spencer & Kaye
ATTORNEYS.

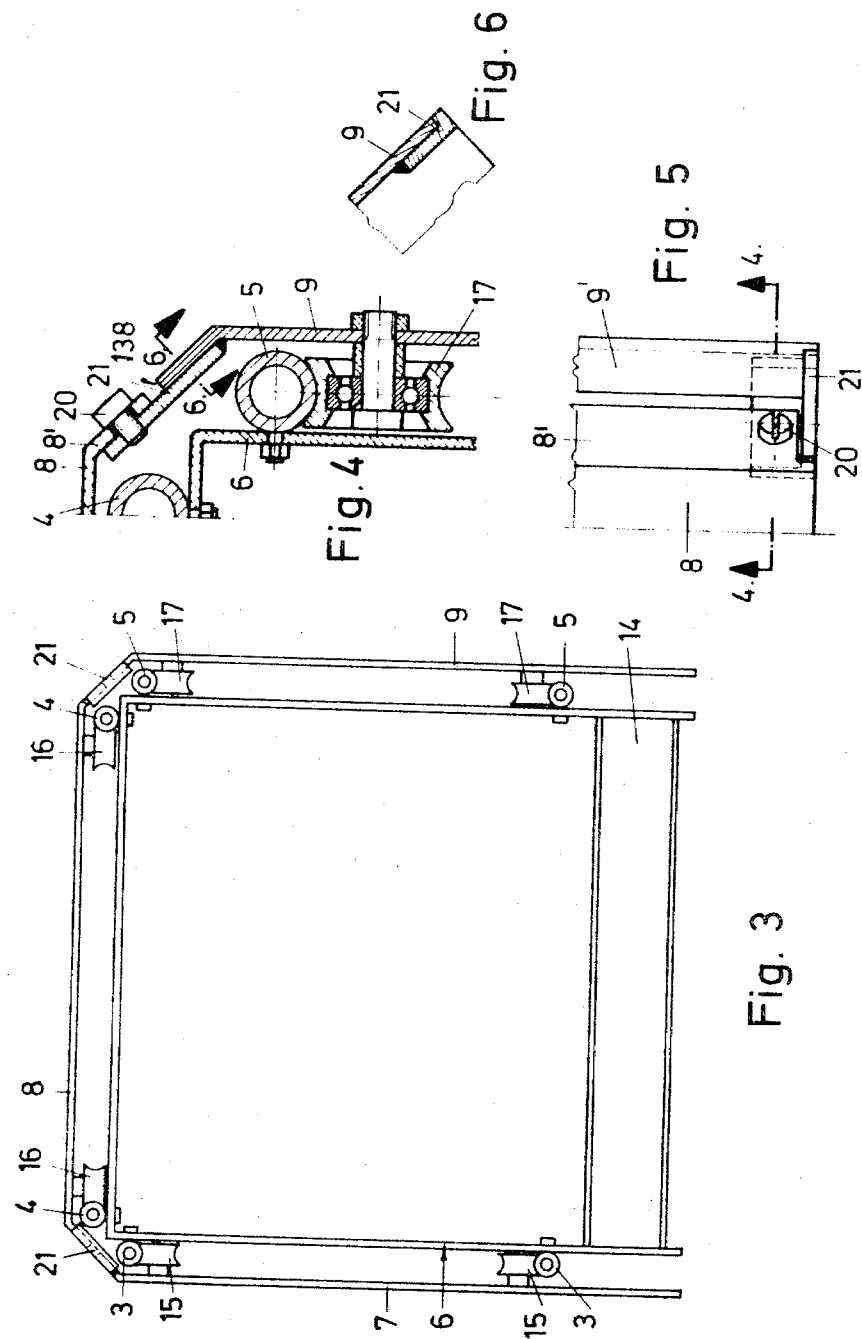

LOCKING UNIT FOR THE CASING MOLD OF AN INJECTION MOLDING

CROSS-REFERENCE TO RELATED APPLICATIONS

This application is related to U.S. applications Ser. No. 133,828 and Ser. No. 133,829, both filed on Apr. 14, 1972. Both of these commonly owned applications are in the name of Karl Hehl, and are based on German patent applications Ser. No. P 20 20 060.6, filed in Germany on Apr. 24th, 1970, and Ser. No. P 20 19 875.8, filed in Germany on Apr. 24th, 1970, respectively.

BACKGROUND OF THE INVENTION

The present invention relates to a clamping unit for the mold of an injection molding machine having at least one protective hood which covers the clamping unit in the area of the mold. In the case of usual machines not all sides of the clamping unit in the area of the mold are covered with protective hoods and on the other hand the present protective hoods cannot be moved one independently of the other. It is therefore often necessary to open relatively large protective surfaces in order to attach injection cylinders or special units in the area of the mold or of the toggle-lever mechanism for mold closing. The usual machines offer neither a maximum of security nor a maximum of facility of manipulation.

SUMMARY OF THE INVENTION

It is an object of the present invention to improve a known clamping unit of the above-mentioned type so that the position of the protective covering can be adapted to a much higher degree to changing requirements, these changes exist particularly with injection molding machines that have a plurality of injection cylinders operating into the mold parting line or are provided with special units.

This object, among others, is accomplished, according to the present invention, in that at least three protective cover plates are provided which are independently movable in the operating direction of the clamping unit.

Preferably these protective cover plates, which cover the locking unit along its sides and top, are connected to one another.

In a preferred embodiment of the present invention a side protective cover plate is connected with the driving segment of a hydraulic or pneumatic piston and cylinder, which itself is supported by a stationary part of the clamping unit.

BRIEF DESCRIPTION OF THE DRAWINGS

FIG. 1 is a schematic side elevation view, partly in cross section, of a clamping unit according to the present invention as seen from the side of the operator.

FIG. 2 is a schematic top plan view of the clamping unit of FIG. 1.

FIG. 3 is a front elevation view of another embodiment of a protective cover according to the present invention.

FIG. 4 is a cross-sectional detail view of the top right corner of FIG. 3 taken generally along line 4—4 of FIG. 5.

FIG. 5 is a fragmentary plan view of the detail of FIG. 4.

FIG. 6 is a fragmentary cross-sectional view taken generally along line 6—6 of FIG. 4.

DESCRIPTION OF THE PREFERRED EMBODIMENTS

A clamping unit connected with a machine base (not shown) of an injection molding machine via a stationary, axially extended mold clamping plate 1 is shown in FIGS. 1 and 2. Mold clamping plate 1 has, for example, four hydraulic pressure cylinders 31 which are connected together by connecting portions 1', and which serve to produce the locking pressure for the mold. At the free ends 32' (FIG. 1) of piston rods 32 of pistons 33 housed in cylinders 31 (only one of which is shown in FIG. 1) is fastened a movable mold clamping plate 34. An example of the construction of such clamping units may be found in U.S. Pat. No. 3,564,658, issued Feb. 23rd, 1971, to Karl Hehl.

A carriage (not shown) is disposed in a guide 2 of stationary mold clamping plate 1, to be axially displaceable in the opening direction of the mold. This carriage is provided with connecting sleeves for an injection unit operating into the parting line. An example of such a carriage may be found in the commonly owned U.S. Pat. application Ser. No. 133,828 filed Apr. 14th, 1972 by Karl Hehl and based on German application Ser. No. P 20 20 060.6, filed in Germany on Apr. 24th, 1970.

A stationary protective hood 6 with a crossbar 14 (FIG. 3) encloses the clamping unit on three sides in the surrounding area of movable clamping plate 34. The protective hood 6 has a U-shaped cross section (FIG. 3) and is removably connected via three pairs of guide rods 3, 4, 5 to extensions 1" of stationary clamping plate 1. The guide rod pairs 3, 4, 5, which are connected in a known manner to the protective hood 6, hold associated protective cover plates 7, 8, and 9, which are mounted to be moved independently of one another in the opening direction of the clamping unit by means of roller pairs 15, 16, and 17. Rollers 15, 16 and 17 are mounted to plates 7, 8, and 9 in any suitable, known manner. In the protective position, these protective plates 7, 8, and 9 cover the clamping unit on three surfaces — both sides and the top — in the area of the mold. On the operator's side of the clamping unit, a suitable, known hydraulic or pneumatic cylinder 11 (FIG. 1) is fastened to the stationary protective hood 6. The piston rod 13 of cylinder 11 is connected to protective plate 7. The top protective plate 8 engages the protective plate 7 with a projection, or lug 8' (FIG. 1). In this way, plate 8 is retained in the protective position when the protective plate 7 is also in the protective position.

In the same manner, protective cover plate 9 engages protective cover plate 8 with a projection 9' so that protective cover plate 9 is retained in the protective position when protective cover plate 8 is also in the protective position.

The pairs of guide rods 3, 4, 5 are preferably hollow so as to enclose electrical and/or fluid lines.

The protective cover plates 8 and 9 may define a cutout area corresponding to the center region of mold 40 when these plates 8 and 9 are in the protective position, and plates 8 and 9 may be provided with sliding panels 10 which cover the parting line 35 of the mold and the center region of the mold 40. The area of these panels 10 is so dimensioned that when a panel 10 is open, an injection unit can operate into the parting line 35 without it being necessary to bring the respective main protective cover plate 8 or 9 out of the protective position. The panels 10 can be manually moved to any desired position and fixed there by means of suitable, known arresting screws 36 which engage in arresting holes 19. Known guides 18 may be used to form sliding bearings with peripheral portions of panels 36 in a known manner.

The protective plates 7, 8, and 9, instead of moving independently of one another can be connected to one another in the area of abutment grooves 138 (FIG. 4) by means of suitable fasteners such as screws 20, each fastener passing through a connecting metal plate 21. The connection may also be made by, for example, welding plate 21 to one of the two abutting protective angle portions 8' and 9' and cover plates — plate 9 in FIG. 4.

As can be seen in FIG. 6, the connecting plate 21 is configured to enclose the front edge of the protective plate 9, as can also be seen in FIG. 5.

Two switching rods 26, 27 may be fastened to protective plate 7 and are arranged to extend parallel to the opening direction of the clamping unit and extend beyond plate 7 in the direction toward the stationary clamping plate 1. The switching rods 26, 27 are provided with inclined surfaces 39, 38, respectively which are well suited to actuate the follower members of switching devices when the switching rods 26, 27 are moved in a direction along the longitudinal axis of the clamping unit. The inclined surface 39 of the switching rod 26 cooperates with the sensing cam 28 (FIG. 1) of a suitable, known safety valve 24 which controls the fluid cycle of the molding machine. Safety valve 24 is fastened in a known manner to the stationary mold clamping plate 1. When the protective plate 9 is in its open position, valve 24 is closed and the fluid cycle in the molding machine is interrupted. The inclined surfaces 38 of the rod 27 cooperate with the roller followers 29 of suitable electrical devices such as microswitches 30, which are also fastened in a suitable, known manner to the stationary mold clamping plate 1.

Microswitches 30 control the main current circuit (not shown) of the molding machine in a known manner. As soon as the protective plate 9 is moved from the protective position, the switches 30 are opened and the main current flow is interrupted.

The following different positions are possible for the protective cover of the present invention:

a. The protective plate 7 is moved out of its protective position, whereas the protective plates 8, 9 are in the protective position.
b. The protective plates 7 and 8 are out of their protective position, while the protective plate 9 is in its protective position.
c. All of the protective plates 7 to 9 are out of the protective position.

When the protective plates 8, 9 are in the protective position, the panels 10 may be open, closed or partially open when an injection unit operates into to the separating groove, or a special unit cooperates with the mold. Since the panels 10 are connected to the plates 8, 9, the plates 7, 8, 9 can also be moved out of their protective position when there is present injection units which operate through the area opened by open panels 10 into the separating groove or special units — core pullers, feeding devices, unscrewing devices, and the like — which cooperate with the mold.

It will be understood that the above description of the present invention is susceptible to various modifications, changes and adaptations, and the same are intended to be comprehended within the meaning and range of equivalents of the appended claims.

I claim:

1. In a clamping unit for clamping a mold of an injection molding machine and having two side surfaces and a top surface, the unit including a stationary mold clamping plate and a movable mold clamping plate movable in an opening direction away from the stationary mold clamping plate to define thereby an open position of the clamping unit, the improvement comprising: at least one removable protective cover means for covering the clamping unit in the area of the mold and having a stationary protective hood mounted to the clamping unit so that it covers said movable mold clamping plate when said movable mold clamping plate is in said open position; first, second, and third protective cover plates arranged to be moved in the opening direction of the movable mold clamping plate between a protective position and an open position; a fluid piston and cylinder connected at one end to said stationary mold clamping plate and at the other end to said first cover plate for moving said first cover plate; and means associated with said cover means for interrupting the operation of the injection molding machine when said first cover plate is in the open position, wherein said first cover plate is vertically oriented and covers one of said side surfaces, said second cover plate covers the other of said side surfaces and said third cover plate covers said top surface, said third cover plate having projection means for engaging said first cover plate for retaining said third cover plate in said protective position when said first cover plate is in said protective position, said second cover plate having projection means for engaging said third cover plate for retaining said second cover plate in said protective position when said third dover plate is in said protective position, and said second and third cover plates each have a cut-out area through which access is provided to said mold when said second and third cover plates are in said protective position, and wherein the improvement further comprises a slide panel for each of said second and third cover plates, with each of said slide panels being mounted to its respective cover plate to normally cover said corresponding cut-out and for slidable movement relative to its respective cover plate to provide such access to said mold.

2. The clamping unit defined in claim 1, wherein said cover plates are arranged to be moved independently of one another.

3. The clamping unit defined in claim 2, wherein said interrupting means has an electrical device.

4. The clamping unit defined in claim 1, wherein said interrupting means interrupts the main current flow of the injection molding machine when said first cover plate is in the open position.

5. The clamping unit defined in claim 1, wherein said interrupting means interrupts the fluid flow of the injection molding machine when said first cover plate is in the open position.

6. The clamping unit defined in claim 1, wherein said cover means has guide rods arranged in three pairs and a pair of rollers rotatably mounted on each of said cover plates and arranged to coact with a respective one of the pairs of guide rods for movably mounting the cover plates on the guide rods.

7. The clamping unit defined in claim 6, wherein said stationary protective hood has a U-shaped cross section, with said guide rods being connected to said protective hood.

8. The clamping unit defined in claim 7, wherein said guide rods are hollow rods for permitting electrical and fluid lines to pass therethrough.

9. The clamping unit defined in claim 8, wherein the mold has a parting line in its center region, and wherein said cut-out areas are dimensioned to provide access to the center region of the mold when their respective plates are in said protective position, and wherein each of said slide panels are dimensioned to cover the parting line and the center region of the mold and are arranged for movement with respect to their respective cover plate in the opening direction of the movable mold clamping plate.

10. The clamping unit defined in claim 9, further including arresting screw means for fixing said sliding panels in any desired position.

11. The clamping unit defined in claim 10, wherein said interrupting means includes a first switching rod mounted on said first cover plate and arranged to extend beyond said first cover plate into the area of said stationary clamping plate and oriented in the opening direction of said movable mold clamping plate, said first switching rod defining an inclined surface, and said interrupting means further includes means arranged to coact with said inclined surface for controlling a fluid circuit of the injection molding machine.

12. The clamping unit defined in claim 11, wherein said coacting means is a safety valve, and wherein said interrupting means further includes a second switching rod defining a plurality of inclined surfaces, and a plurality of microswitches having follower members arranged to coact with said inclined surfaces, said second switching rod actuating, through the engagement of one of said inclined surfaces with one of said followers, said microswitches for interrupting the main current flow of the clamping unit.

13. The clamping unit defined in claim 1, wherein said cover plates are connected to one another.

14. The clamping unit as defined in claim 13, wherein said cover plates are connected to one another by screw fasteners.

15. The clamping unit as defined in claim 14, wherein said cover plates are partially connected to one another by a weld.

* * * * *

UNITED STATES PATENT OFFICE
CERTIFICATE OF CORRECTION

Patent No. 3,744,949           Dated  July 10th, 1973

Inventor(s) Karl Hehl

It is certified that error appears in the above-identified patent and that said Letters Patent are hereby corrected as shown below:

In the title of the patent on the title page and in Column 1, change "CASING" to --CASTING--. Column 3, line 61, after "into" delete "to". Column 4, line 42, change "dover" to --cover--.

Signed and sealed this 20th day of November 1973.

(SEAL)
Attest:

EDWARD M. FLETCHER, JR.
Attesting Officer

RENE D. TEGTMEYER
Acting Commissioner of Patents